July 24, 1962  F. M. SMETKO  3,046,057
HEAD REST FOR SEAT BACKS
Filed May 27, 1960
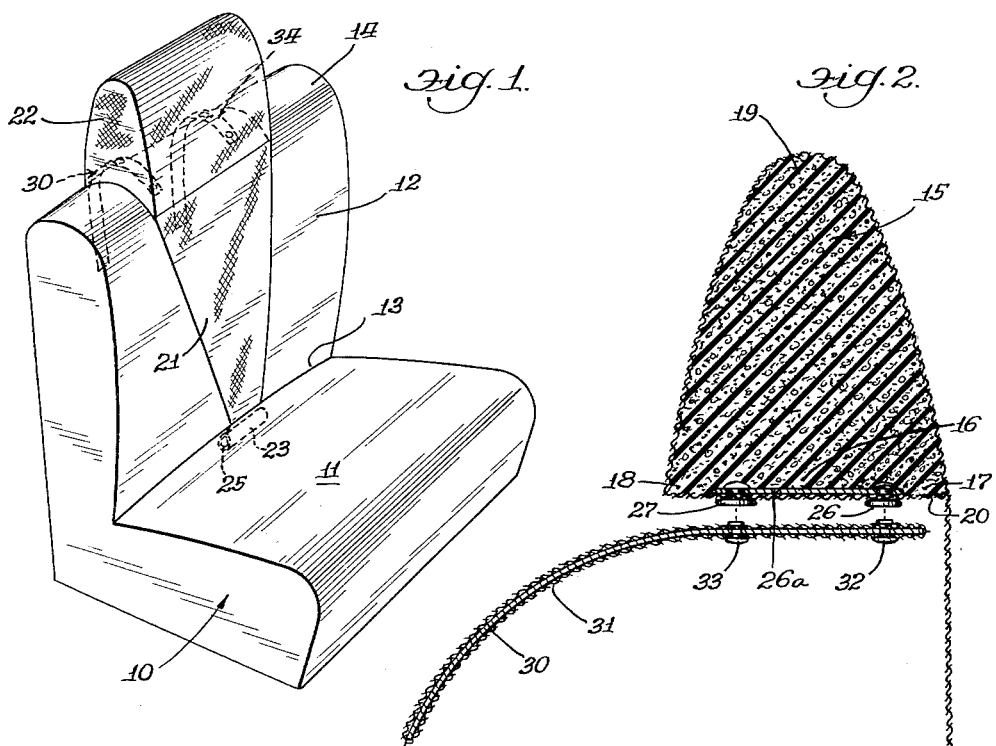
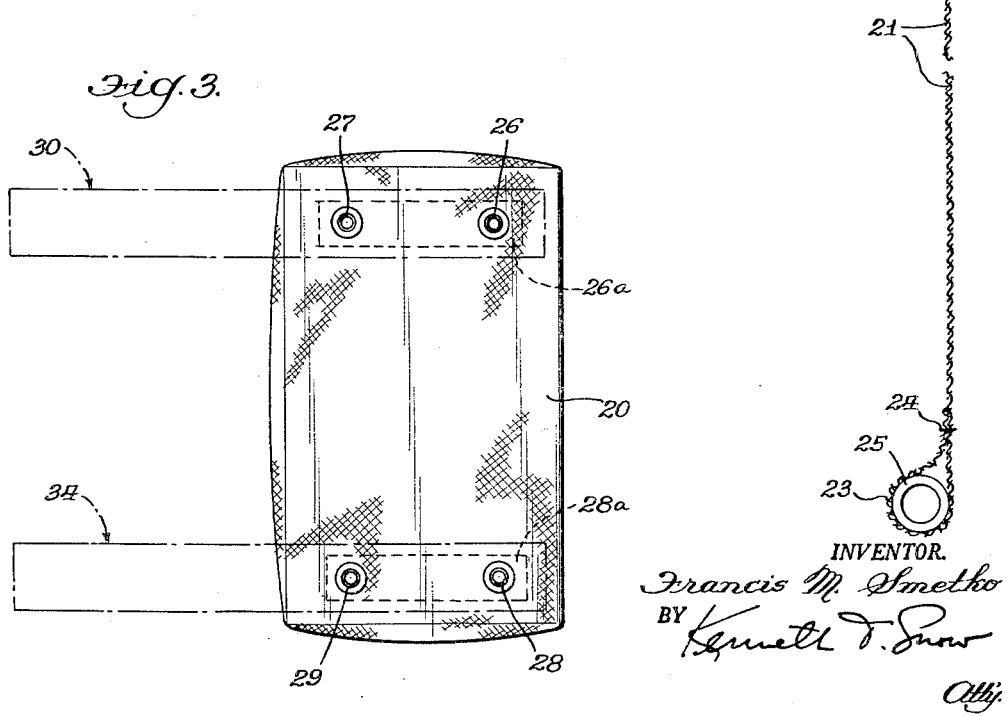
INVENTOR.
Francis M. Smetko
BY Kenneth T. Snow
Atty.

United States Patent Office 3,046,057
Patented July 24, 1962

3,046,057
HEAD REST FOR SEAT BACKS
Francis M. Smetko, 1334 S. 56th Court, Cicero, Ill.
Filed May 27, 1960, Ser. No. 32,408
5 Claims. (Cl. 297—397)

This invention relates to a new and improved head rest for seat backs.

Seat backs, and particularly those in present day automobiles, are relatively short in height and oftentimes fail to give a passenger's head the rest or safety he desires or needs. It was with this in mind that the applicant herein invented his head rest and its attachment means for seat backs. Although the head rest cushion of this invention is primarily for an automobile seat it should be understood it is equally applicable to any seat whether in a house or vehicle.

An important object of this invention is to provide a head rest for removable attachment to the top of a seat back.

Another important object of this invention is the provision of means for holding a head rest against fore and aft relative movement when applied to the top of a seat back.

Another important object of this invention is to supply a cushioned head rest for the backs of automobile seats in which means are included for fastening the front and back of the head rest to the seat back.

Still another important object of this invention is to equip a removable head rest for automobile seat backs with a downwardly depending skirt on the front thereof.

A still further important object in the head rest of this invention is to provide a downwardly depending attaching skirt diminishing in width as it progresses downwardly and having an enlarged rigid rod member transversely disposed in the narrow bottom and arranged to be press fitted between the seat and seat backs to thereby hold the front of the head rest to the seat.

Another and still further important object of this invention is the provision of deformable bar means attached to the head rest and bendable to conform to the shape of any seat back.

A still further important object of this invention is to equip a head rest with deformable bars which are removably fastened to the head rest on the under side thereof and project rearwardly for forming down and over the seat back on which the head rest is mounted.

A still further important object of this invention is to supply snap fastener means on formable bar members for the removable fastening of said bars to the head rest to thereupon facilitate fastening of the back of the head rest to the seat back on which it is mounted and thereby hold the head rest against undesired forward movement of the head rest.

Another and still further important object is to provide an upward extension for the backs of vehicle seats which acts to safeguard the user against whiplashing of the head during accidents or sudden starting or stopping of the vehicle.

Other and further important objects and advantages will become apparent from the disclosures in the following specification and accompanying drawings:

In the drawing:
FIGURE 1 is a perspective view showing a vehicle seat and back therefor with the head rest of this invention mounted thereon.

FIGURE 2 is a vertical sectional view taken through the head rest of FIGURE 1 with certain of the parts thereof separated to indicate the construction of the head rest and its attaching means.

FIGURE 3 is a bottom plan view of the head rest.

As shown in the drawing:

The reference numeral 10 indicates generally a vehicle seat having a generally horizontally disposed seat portion 11 and a generally vertically disposed back cushion portion 12. Between the seat 11 and its back 12 the cushions join in a juncture line 13. It is customary for vehicle seats, and even household furniture, to provide a relatively tight seal between the seat and back portions thereof and it is this principle of snug engagement between seat and back that is utilized by applicant as one means for holding the head rest in position on the seat. The seat back 12 has a top portion 14 which as shown in FIGURE 1 is flat or slightly convex such that when a head rest cushion or back extension is applied to the top thereof it may be held relatively fixed to the top 14 to provide for an effective extension or head rest.

As best shown in FIGURE 2 the head rest of this invention comprises preferably a sponge rubber cushion 15 formed in generally triangular or wedge shape with a flat bottom 16 having forward and rearward triangle apices 17 and 18 respectively. The top apex of the triangle is shown at 19 and is generally rounded to enhance the head resting characteristics of the cushion.

A cloth covering for the cushion 15 is preferably initially attached to the triangularly shaped cushion at its bottom and front apex 17 and thence is carried rearwardly across the bottom 16 of the cushion, thence around the apex corner 18 and up over the back wall, over the rounded top apex 19 and thence downwardly over the front wall and back over the starting point 17 of the cushion where it continues downwardly as a skirt as shown at 21. The fastening of the covering material 20 to the cushion 15 is accomplished by any one of several means, such as stitching or by the use of glue or cement, or the like. Further, it should be understood that although the cushion has been generally described as a sponge rubber cushion, it may be made of any other suitable cushion material. And, the covering material 20 may be attached to the inner cushion at various points or the covering may be cemented or otherwise fastened over the full surface of the cushion. The depth of the bottom 16 of the cushion 15 is generally comparable to the depth of a seat back such as the top 14 of the seat shown in FIGURE 1. The head rest of this invention thus forms an effective upward continuation of the seat back 12.

The covering material 20 is preferably stitched together upon the encirclement of the material from the initial contact point around the cushion and over the front portion thereof. This stitching provides that the cushion material 15 is completely encompassed by an endless covering material and coupled with the fact that the covering material is attached to or fastened around the circumference of the cushion 15 there is no material relative movement of the covering with the cushion.

In addition to the encircling material 20 there is provided triangularly shaped end gussets 22 preferably made of the same material. The cushion covering material 20 and 22 and its front depending skirt 21 is generally the same material throughout and may be any upholstery fabric of a type suitable for resting the head thereon. Preferably the fabric should be of a soft type capable of withstanding a certain amount of abusive treatment such as a car pillow or in this instance a head rest cushion might receive in an automobile with people getting in and out and possibly taking the head rest off or putting it on the seat back. It is expected that the head rest will be left in position on the seat back once it is mounted although it is removable.

The depending skirt 21 coming down over the front of the seat back 12 progressively narrows from top to bottom. The narrow bottom of the skirt 21 is provided with a looped lower end 23 by having the lower end of the skirt stitched back upon itself as shown at 24. The looped end 23 forms a sleeve to receive a rigid member 25, which in this instance is tubular in shape and is substantially coextensive with the narrow lower end of the front depending skirt 21. In mounting the head rest cushion 15 and its completely enclosing fabric covering 20—21—22 onto the seat back top 14 the skirt 21 hangs over the front 12 of the seat back. The bottom looped end 23 with its rigid member 25 enclosed therewithin is stuffed into the juncture 13 between the seat 11 and the back 12. The snug engaging line 13 between the seat and back acts to pinch the enlarged rigid member 25 into the juncture between the seat and back and holds the skirt relatively fixed to the front of the seat back 12. The length of the skirt is preferably longer than the usual height of a seat back to thereby permit and accommodate use of the head rest on any size seat. When the head rest is used on low back seats the bottom of the skirt is rolled up on its rigid tubular member 25 an amount commensurate with the height of the seat back. The rolled up bottom may then be neatly inserted into the juncture of seat and back without any surplus material hanging loosely therefrom. This then provides the means for holding the head rest onto the top of the seat back 14 against any undesirable relative rearward movement of the head rest from the top 14.

As best shown in FIGURES 2 and 3, the covering 20 over the bottom 16 of the cushion 15 is provided with spaced apart snap fastener means 26, 27, 28 and 29. Stiffening members 26a and 28a are provided beneath the fabric covering 20 to give added rigidity for the snap fastener elements 26 and 27, and 28 and 29 respectively. The stiffening members 26a and 28a are generally rectangular in shape and may be plastic, fibreboard, or even a stiff cardboard as desired. The support for the snap fasteners is thus reinforced and tends to maintain fixed spacings for the fastener elements. A deformable metal bar 30 is provided with a fabric covering 31 comparable in material to the fabric covering 20 of the head rest cushion 15. Complementary snap fastener means 32 and 33 are provided in and through the deformable bar 30 and including passage of the snap fastener means through the fabric covering 31. This means there is no relative movement of the complementary snap fastener means 32 and 33 with the centrally disposed deformable bar 30. The complementary snap fastener means 32 and 33 are arranged and constructed for engagement with the snap fastener elements 26 and 27 on the cushion covering 20. Thus by a mere snapping operation the head rest is provided with a removable deformable bar 30 as a fixed part of the cushion 15. The deformable bar 30 has the portion thereof which carries the complementary snap fastening elements 32 and 33 substantially coextensive in length with the underside of the cushion 15 along the bottom 16 thereof and includes a substantial rearward extension which may be deformed over the back wall of any shape of vehicle seat back. A second deformable bar 34 as shown in FIGURES 1 and 3 is preferably arranged parallel to the bar 30 and is similarly provided with complementary snap fastener elements which removably engage with the snap fasteners 28 and 29. This then provides a second deformable member at the other end of the head rest cushion to enable the clamping of the cushion to the seat back in spaced apart position. The illustration in FIGURE 1 shows how the rearward extending portions of the deformable bars 30 and 34 are bent to snugly engage the back portions of the seat back 12 and thereby prevent relative separate forward movement of the cushion 15.

It is apparent that herein is provided a head rest for removable application to the backs of vehicle seats or any other piece of furniture wherein it is desired to extend the height of the back. Automobile seat backs are notoriously low and riding for long distances becomes very tiresome. The head rest of this invention is designed to overcome the deficiency of short seat backs. It provides added height to give more complete support to a rider's back and additionally provides a resting place for the rider's head.

The removable attaching means for the head rest comprises means to prevent undesired fore or aft relative movement with the top of the seat back. The means for preventing rearward movement of the head rest includes the depending skirt attached at its bottom to the juncture between seat and back while the means to prevent forward movement of the head rest includes the rearwardly extending deformable bars. Important features of both front and back attaching means are the diminishing width of the skirt with the large diameter reinforcing rod at the bottom thereof and the snap fastener removable deformable bar members. The better support for the head of a passenger in any moving vehicle is a safety feature. When a vehicle is stopped or started suddenly for any reason, a passenger's head tends to whip back oftentimes causing neck injuries. Thus the stable support for a passenger's head tends to prevent many possible head and neck injuries.

I am aware that numerous details of construction may be varied throughout a wide range without departing from the principles disclosed herein and I therefore do not propose limiting the patent granted hereon otherwise than as necessitated by the appended claims:

What is claimed is:

1. A head rest for a seat of the type having a generally horizontal seat and a separate generally vertically disposed back, said head rest comprising a cushion having a relatively deep base for disposition on top of the vehicle seat back and said cushion forming an upward continuation for said seat back, a covering for said cushion, said covering including a skirt depending down over the full height of the front of the generally vertically disposed seat back, a rigid member fastened transversely in the lower end of the skirt and arranged and constructed to be held between the generally horizontal seat and the generally vertical seat back to thereby hold the head rest cushion against rearward movement from its position on top of the seat back, and deformable bar members fastened to said cushion and arranged and constructed for bending over and around the back of the seat back to thereby hold the head rest cushion against relative forward movement away from its position on top of the seat back.

2. A device as set forth in claim 1 in which the deformable bar members are removably fastened to said cushion.

3. A device as set forth in claim 2 in which the cushion covering has snap fastener means on the underside of said cushion, and the deformable bar members have complementary snap fastener means thereon for the removable attachment of the bars to the cushion.

4. A head rest extension for a seat back comprising a generally wedge shape cushion with the deep side thereof constituting the bottom and adapted to rest on the top of the seat back, and means on the cushion for removably fastening to said seat back, said head rest cushion including a covering material, and the means for removably fastening the cushion to the seat back including snap fastener means formed on said covering material, and deformable bar members having complementary snap fastener means formed thereon, whereby the deformable bar members may be snap fastened to the cushion covering material and thereafter have their ends deformed to the contour of the seat back on which the cushion is mounted to hold the cushion against shifting movement from the seat back.

5. A device as set forth in claim 4 in which the deformable bars are covered with a material similar to the cushion covering material.

References Cited in the file of this patent

UNITED STATES PATENTS

| | | |
|---|---|---|
| 305,428 | Covert | Sept. 23, 1884 |
| 1,083,633 | Saunders | Jan. 6, 1914 |
| 1,882,485 | Clements | Oct. 11, 1932 |
| 2,581,888 | Schlegel | Jan. 8, 1952 |
| 2,632,497 | Brady | Mar. 24, 1953 |
| 2,833,344 | Lucht | May 6, 1958 |
| 2,867,266 | Vogler | Jan. 6, 1959 |
| 2,874,757 | Requa | Feb. 24, 1959 |